(12) United States Patent
Koh et al.

(10) Patent No.: US 10,946,772 B2
(45) Date of Patent: Mar. 16, 2021

(54) APPARATUS AND METHOD FOR CONTROLLING HEADREST OF VEHICLE SEAT

(71) Applicant: HYUNDAI DYMOS INCORPORATED, Seosan-si (KR)

(72) Inventors: Sang Kyung Koh, Yongin-si (KR); Jong In Shin, Hwaseong-si (KR); Sang June Lee, Hwaseong-si (KR); Seong Youn Jo, Seoul (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 31 days.

(21) Appl. No.: 16/224,044

(22) Filed: Dec. 18, 2018

(65) Prior Publication Data

US 2019/0118675 A1    Apr. 25, 2019

Related U.S. Application Data

(63) Continuation of application No. PCT/KR2017/007047, filed on Jul. 3, 2017.

(30) Foreign Application Priority Data

Jul. 19, 2016  (KR) .......................... 10-2016-0091662

(51) Int. Cl.
*A47C 1/02* (2006.01)
*B60N 2/02* (2006.01)
(Continued)

(52) U.S. Cl.
CPC ............. *B60N 2/0252* (2013.01); *B60N 2/02* (2013.01); *B60N 2/06* (2013.01); *B60N 2/20* (2013.01);
(Continued)

(58) Field of Classification Search
CPC . B60N 2/995; B60N 2/02; B60N 2/62; B60N 2/0252
See application file for complete search history.

(56) References Cited

U.S. PATENT DOCUMENTS 5,975,637 A * 11/1999 Geuss .................... B60N 2/002
                                                    297/391
6,227,489 B1 * 5/2001 Kitamoto ............... B64D 11/00
                                                    244/118.5
(Continued)

FOREIGN PATENT DOCUMENTS

JP    2003-285673 A    10/2003
JP    2007-062510 A    3/2007
(Continued)

OTHER PUBLICATIONS

International Search Report issued in corresponding International Application No. PCT/KR2017/007047 dated Sep. 15, 2017, with translation (5 pages).
(Continued)

*Primary Examiner* — Shin H Kim
(74) *Attorney, Agent, or Firm* — Osha Bergman Watanabe & Burton LLP

(57) ABSTRACT

An apparatus for controlling a headrest for a vehicle seat includes: a headrest disposed at an upper side of a vehicle seat and that moves to an upper end or a lower end; a slider that moves the seat forward or rearward; a recliner that rotates the seat forward or rearward; a drive unit that operates the headrest, the slider and the recliner; a sensor unit connected to the drive unit and that detects a position of the headrest, a position of the slider and a rotation angle of the recliner; an input unit that receives an inputted operation instruction to operate the slider and the recliner from a user; and a control unit that controls the drive unit based on the inputted operation instruction and operates the headrest
(Continued)

upward or downward in accordance with the detected position and the detected rotation angle.

8 Claims, 10 Drawing Sheets

(51) Int. Cl.
    *B60N 2/829*      (2018.01)
    *B60N 2/06*      (2006.01)
    *B60N 2/20*      (2006.01)

(52) U.S. Cl.
    CPC ...... *B60N 2/829* (2018.02); *B60N 2002/0272* (2013.01)

(56) References Cited

U.S. PATENT DOCUMENTS

| | | | | |
|---|---|---|---|---|
| 6,583,596 | B2* | 6/2003 | Nivet | B60N 2/0244 |
| | | | | 318/626 |
| 7,528,563 | B2* | 5/2009 | Thoreux | B64D 11/06 |
| | | | | 318/466 |
| 7,546,215 | B2* | 6/2009 | Muhammad | B64D 11/06 |
| | | | | 702/94 |
| 7,647,151 | B2* | 1/2010 | Abt | B64D 11/06 |
| | | | | 701/45 |
| 10,562,426 | B2* | 2/2020 | Scott | B60N 2/868 |
| 2002/0158497 | A1* | 10/2002 | Nivet | B60N 2/0244 |
| | | | | 297/330 |
| 2008/0007101 | A1* | 1/2008 | Abt | B64D 11/0643 |
| | | | | 297/240 |
| 2008/0009958 | A1* | 1/2008 | Abt | B64D 11/06 |
| | | | | 700/29 |
| 2010/0026070 | A1* | 2/2010 | Rohee | B60N 2/0248 |
| | | | | 297/344.1 |
| 2014/0265479 | A1* | 9/2014 | Bennett | B60N 2/919 |
| | | | | 297/217.4 |
| 2015/0352979 | A1* | 12/2015 | O'Bannon | B60N 2/0248 |
| | | | | 701/49 |

FOREIGN PATENT DOCUMENTS

| | | |
|---|---|---|
| JP | 2012-176737 A | 9/2012 |
| JP | 2015-123909 A | 7/2015 |
| JP | 2015-209193 A | 11/2015 |
| KR | 2004-0043874 A | 5/2004 |

OTHER PUBLICATIONS

Office Action issued in the counterpart Chinese Patent Application No. 201780036416.0, dated Jul. 16, 2020 (17 pages).

* cited by examiner

CONVENTIONAL ART

APPARATUS AND METHOD FOR CONTROLLING HEADREST OF VEHICLE SEAT

TECHNICAL FIELD

The present invention relates to an apparatus and a method for controlling a headrest for a vehicle seat, and more particularly, to an apparatus and a method for controlling a headrest for a vehicle seat, which avoid an interference between the headrest for a vehicle seat and a sun visor installed on the vehicle, thereby preventing damage to the sun visor caused by a user's carelessness.

BACKGROUND

In general, a seat for a vehicle has a headrest which serves to support an occupant's head and is installed at an upper end of a seatback for supporting the occupant's back. The headrest serves to support the occupant's head when the occupant leans his/her head on the headrest. Furthermore, the headrest is one of the most important seat elements because the headrest serves to support the occupant's head at the time of a collision accident or the like so as to prevent the occupant's head from severely swaying forward and rearward.

Meanwhile, because a height of the seatback is fixed constantly, a height of the headrest installed at the upper end of the seatback is also inevitably fixed. Therefore, in a case in which a tall person is seated in the seat, the height of the headrest is not sometimes suitable for his/her body size. In this case, the height of the headrest may be adjusted to be suitable for the occupant's body condition.

FIG. 1 is an explanatory view illustrating an operation of a headrest in accordance with a slide movement of a general vehicle seat.

As illustrated in FIG. 1, the general vehicle seat slides forward or rearward. In addition, the headrest for a vehicle seat is moved toward an upper end or a lower end by an operation of a headrest height adjusting device.

A headrest height adjusting device operates the headrest downward within a predetermined section when a slider moves forward. In contrast, the headrest height adjusting device operates the headrest upward within a predetermined section when the slider moves rearward. There are headrest height adjusting functions, and there is also a vehicle which adopts a seat in which the sliding and the headrest height adjustment operate in conjunction with each other.

The height of the headrest is decreased when the slider moves forward, and the height of the headrest is increased when the slider moves rearward. The reason is to provide convenience both a tall person and a short person.

When a slider of a driver seat or a passenger seat operates, the height of the headrest is moved upward and downward in accordance with a position of the slider. The operation of the headrest in conjunction with the movement of the slider is performed in consideration of a driver's sitting height or an occupant's sitting height.

Meanwhile, a recliner rotates the seat based on a user's input. In this case, the rotation of the seat by the recliner is performed regardless of the height of the headrest. By the way, a sun visor installed on a ceiling of the vehicle is sometimes damaged when the seat is rotated by the recliner in a situation in which the height of the headrest is automatically adjusted by the operation of the slider. Accordingly, there is a need to avoid interference between the headrest and the sun visor.

SUMMARY

One or more embodiments of the present invention provide an apparatus and a method for controlling a headrest for a vehicle seat, which are capable of preventing damage to a sun visor caused by a user's carelessness by avoiding interference between the headrest for a vehicle seat and the sun visor installed in a vehicle.

To this end, one or more embodiments of the present invention provide an apparatus and a method for controlling a headrest for a vehicle seat, which are capable of preventing damage to the sun visor positioned at a front side by automatically adjusting a position of the headrest.

One or more embodiments of the present invention provide an apparatus and a method for controlling a headrest for a vehicle seat, which are capable of improving a performance of the headrest and improving quality of the headrest and the sun visor by preventing damage to the sun visor caused by a customer's carelessness.

Furthermore, one or more embodiments of the present invention provide an apparatus and a method for controlling a headrest for a vehicle seat, which are capable of satisfying a user, who drives a vehicle or is seated in the vehicle, by avoiding interference between a sun visor and the headrest when controlling the headrest which is a convenience device for a vehicle, and thus preventing damage to the sun visor even though the user operates carelessly.

One or more embodiments of the present invention provide an apparatus for controlling a headrest for a vehicle seat, the apparatus including: a headrest which is provided at an upper side of a vehicle seat and moves to an upper end or a lower end; a slider which moves the seat forward or rearward; a recliner which rotates the seat forward or rearward; a drive unit which operates the headrest, the slider and the recliner; a sensor unit which is connected to the drive unit and detects a position of the headrest, a position of the slider and a rotation angle of the recliner; an input unit which receives an inputted operation instruction to operate the slider and the recliner from a user; and a control unit which controls the drive unit based on the inputted operation instruction and operates the headrest upward or downward in accordance with the detected position of the slider and the detected rotation angle of the recliner to prevent a sun visor positioned at a front side in the vehicle from being damaged.

The control unit may initialize the positions of the headrest, the slider and the recliner by operating the headrest, the slider, and the recliner from an uppermost end to a lowermost end or from a rearmost side to a forwardmost side.

The control unit may initialize the position of the headrest by moving the headrest to the uppermost end when the recliner moves to the rearmost side or the slider moves to the rearmost side.

The control unit may operate the headrest upward or downward and may operate the headrest in a step-by-step manner in accordance with a predetermined height section of the headrest for each position section of the slider.

The control unit may not operate the headrest downward when the rotation angle of the recliner is within a predetermined first angle section and may operate a height of the headrest downward to the lowermost end when the rotation angle is within a predetermined second angle section.

The predetermined first and second angle sections may be distinguished from each other based on a right angle at which the recliner rotates from the rearmost side and becomes normal to a cushion of the vehicle seat.

Meanwhile, one or more embodiments of the present invention provide a method for controlling a headrest which is performed by an apparatus for controlling the headrest for a vehicle seat, the method including: receiving an inputted operation instruction to operate a slider and a recliner from a user; operating each of the slider and the recliner based on the inputted operation instruction; detecting a position of the slider and a rotation angle of the recliner; and operating the headrest upward or downward in accordance with the detected position of the slider and the detected rotation angle of the recliner to prevent a sun visor positioned at a front side in the vehicle from being damaged.

The method may further include initializing the positions of the headrest, the slider, and the recliner by operating the headrest, the slider, and the recliner from an uppermost end to a lowermost end or from a rearmost side to a forwardmost side in a predetermined first initialization mode.

The method may further include initializing the position of the headrest by moving the headrest to the uppermost end when the recliner moves to the rearmost side or the slider moves to the rearmost side in a predetermined second initialization mode.

The operating of the headrest upward or downward may operate the headrest upward or downward and may operate the headrest in a step-by-step manner in accordance with a predetermined height section of the headrest for each position section of the slider.

The operating of the headrest upward or downward may not operate the headrest downward when the rotation angle of the recliner is within a predetermined first angle section and may operate a height of the headrest downward to the lowermost end when the rotation angle is within a predetermined second angle section.

The predetermined first and second angle sections may be distinguished from each other based on a right angle at which the recliner rotates from the rearmost side and becomes normal to a cushion of the vehicle seat.

According to one or more embodiments of the present invention, it is possible to prevent damage to the sun visor caused by a user's carelessness by avoiding interference between the headrest for a vehicle seat and the sun visor installed in the vehicle.

To this end, according to one or more embodiments of the present invention, it is possible to prevent damage to the sun visor positioned at the front side by automatically adjusting the position of the headrest.

According to one or more embodiments of the present invention, it is possible to improve a performance of the headrest and improve quality of the headrest and the sun visor by preventing damage to the sun visor caused by a customer's carelessness.

Furthermore, according to one or more embodiments of the present invention, it is possible to satisfy a user, who drives the vehicle or is seated in the vehicle, by avoiding interference between the sun visor and the headrest when controlling the headrest which is a convenience device for a vehicle, and thus preventing damage to the sun visor even though the user operates carelessly.

DESCRIPTION OF REFERENCE NUMERALS

Figure 1:
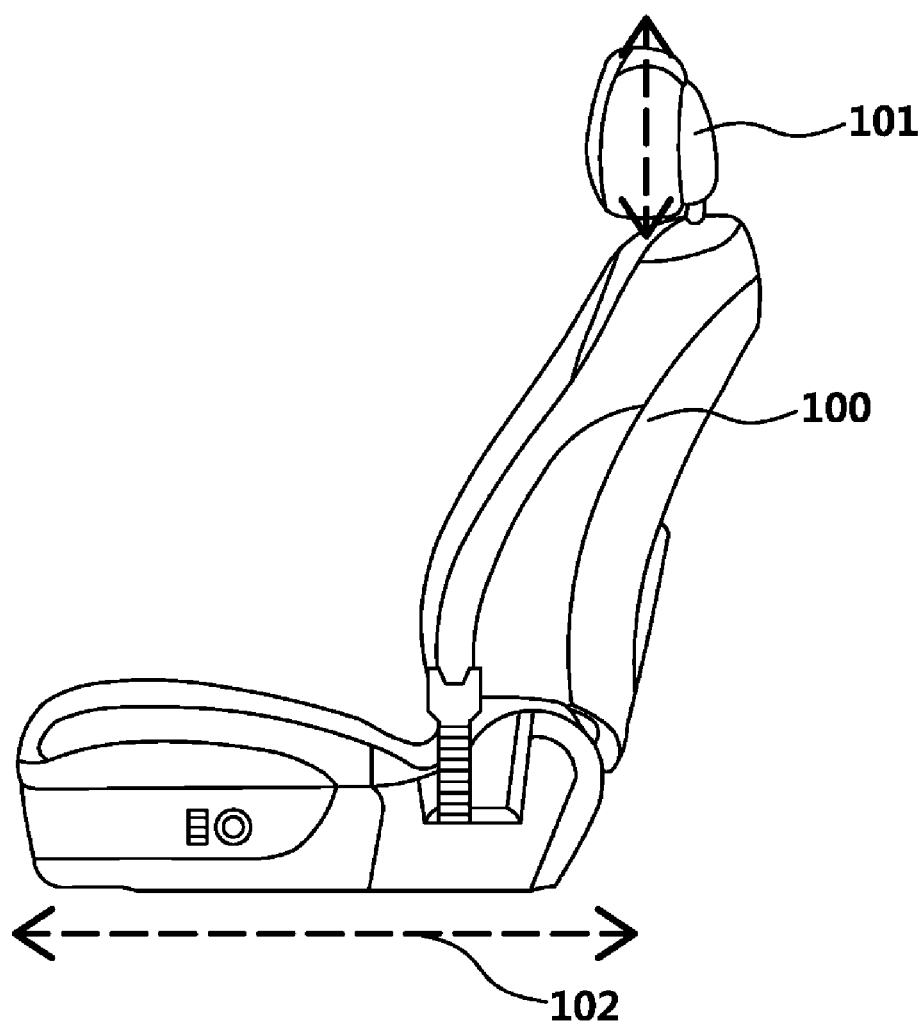
FIG. 1 is an explanatory view illustrating an operation of a headrest in accordance with a slide movement of a general vehicle seat.

100: Seat
101: Headrest
102: Slider
103: Recliner
200: Headrest control apparatus
210: Input unit
220: Control unit
230: Drive unit
231: First drive unit
232: Second drive unit
233: Third drive unit
240: Sensor unit
241: Position sensor

DETAILED DESCRIPTION

Hereinafter, embodiments of the present invention will be described with reference to the accompanying drawings. Embodiments of the present invention will be described in detail, focusing on parts necessary for understanding operations and actions according to one or more embodiments of the present invention. In the description of embodiments, descriptions of technical contents, which are well known in the technical field to which the present invention pertains and are not directly relevant to the present invention, will be omitted. The reason is to more clearly provide the subject matter of the present invention without obscuring the subject matter by omitting the unnecessary description.

In addition, in the description of constituent elements of one or more embodiments of the present invention, different reference numerals may denote constituent elements having the same name in accordance with the drawings, and the same reference numeral may denote constituent elements even though the constituent elements are illustrated in the different drawings. However, this case does not mean that the corresponding constituent elements have different functions in accordance with embodiments or have the same functions in different embodiments. The functions of the respective constituent elements should be determined based on the description of the respective constituent elements according to embodiments.

Figure 2:
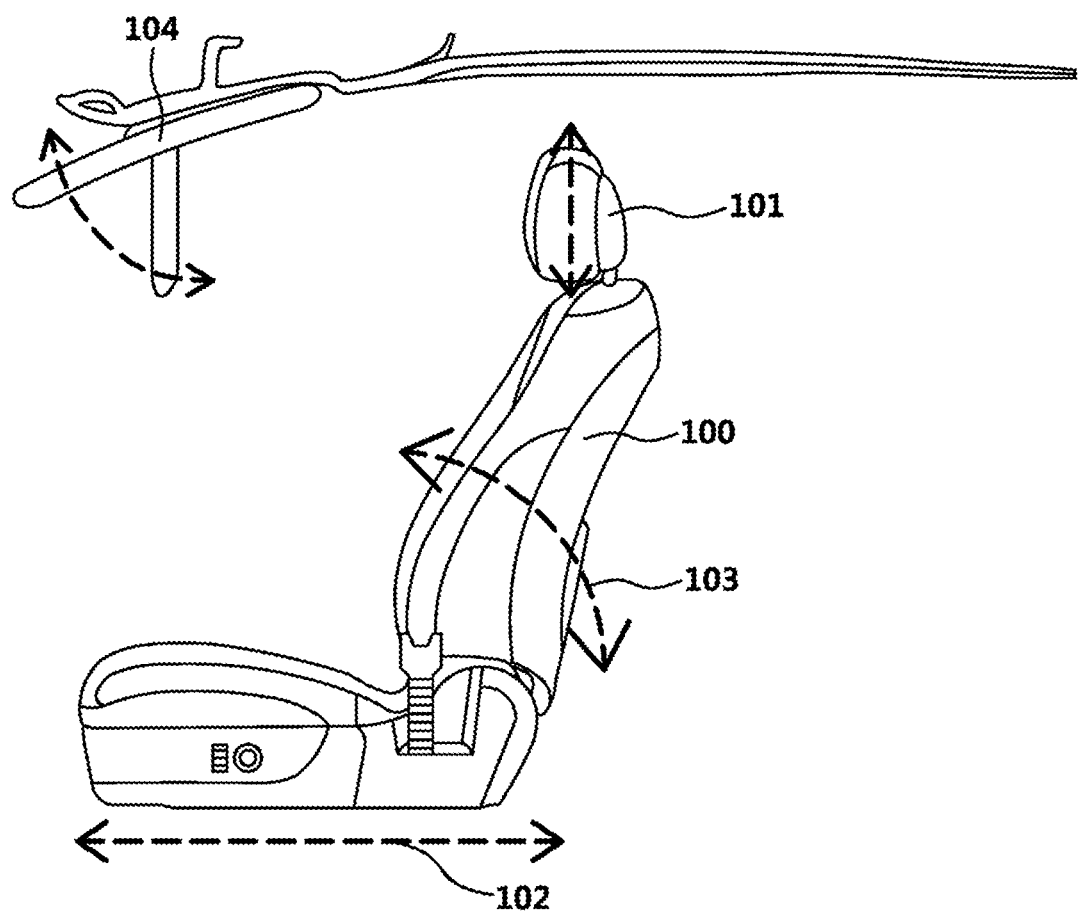
FIG. 2 is an explanatory view illustrating operations of a sun visor and a vehicle seat positioned in a vehicle according to one or more embodiments of the present invention.

FIG. 2 is an explanatory view illustrating operations of a sun visor and a vehicle seat positioned in a vehicle according to one or more embodiments of the present invention.

As illustrated in FIG. 2, a vehicle seat 100 is positioned in a vehicle according to one or more embodiments of the present invention. The vehicle seat 100 includes a headrest 101, a slider 102, and a recliner 103.

The vehicle seat 100 is moved forward or rearward by an operation of the slider 102 or rotated forward or rearward by an operation of the recliner 103. The recliner 103 is mounted at a joint portion between a seatback and a seat cushion of the vehicle seat 100, and a rotation angle of the seatback in a front and rear direction may be adjusted with respect to the seat cushion by the operation of the recliner 103.

Further, the headrest 101 of the vehicle seat 100 is moved toward an upper end or a lower end by the operation of the slider 102 and the operation of the recliner 103. A height of the headrest 101 is adjusted in conjunction with the operation of the slider 102 and the operation of the recliner 103.

Meanwhile, a sun visor is positioned at a front side and on a front ceiling in the vehicle. In one or more embodiments of the present invention, when the slider 102 operates forward or the recliner 103 operates forward, the headrest 101 may be positioned within a section in which the headrest 101 interferes with the sun visor positioned on the ceiling. Therefore, the headrest 101 operates toward the lower end in a step-by-step manner or operates toward the lowermost.

In contrast, in one or more embodiments of the present invention, when the slider 102 operates rearward, the headrest 101 is positioned to avoid the interference with the sun visor positioned on the ceiling. Therefore, the headrest 101 operates upward. In addition, in one or more embodiments of the present invention, when the recliner 103 rotates rearward, the headrest 101 is positioned within a section in which the headrest 101 avoids the interference with the sun visor positioned on the ceiling. Therefore, the headrest 101 operates upward.

As described above, in one or more embodiments of the present invention, a height of the headrest 101 is set to a height at which the sun visor is prevented from being damaged.

Figure 3:
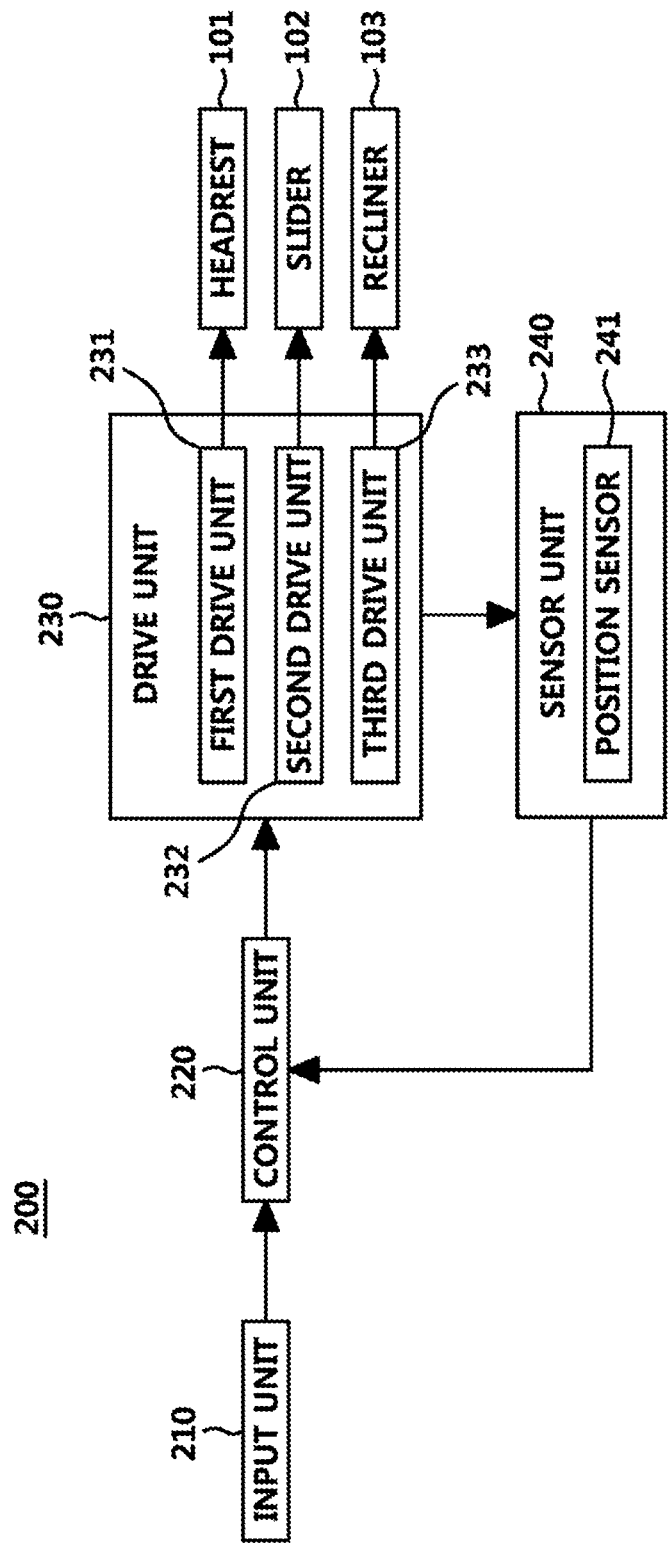
FIG. 3 is a configuration view of an apparatus for controlling a headrest for a vehicle seat according to one or more embodiments of the present invention.

FIG. 3 is a configuration view of an apparatus for controlling the headrest for a vehicle seat according to one or more embodiments of the present invention.

As illustrated in FIG. 3, a headrest control apparatus 200 for the vehicle seat 100 according to one or more embodiments of the present invention includes the headrest 101, the slider 102, and the recliner 103 of the vehicle seat 100, an input unit 210, a control unit 220, a drive unit 230, and a sensor unit 240.

Hereinafter, specific configurations and operations of constituent elements of the headrest control apparatus 200 for the vehicle seat 100 according to one or more embodiments of the present invention in FIG. 3 will be described.

As described above, the headrest 101 is provided at an upper side of the vehicle seat 100 and moved toward the upper end or the lower end.

Further, the slider 102 moves the vehicle seat 100 forward or rearward.

In addition, the recliner 103 rotates the vehicle seat 100 forward or rearward.

Meanwhile, the drive unit 230 operates the headrest 101, the slider 102, and the recliner 103.

Here, the drive unit 230 includes first to third drive units.

The first drive unit 231 is connected to the headrest 101 and operates to move the headrest 101 toward the upper end or the lower end.

The second drive unit 232 is connected to the slider 102 and operates to move the slider 102 forward or rearward.

The third drive unit 233 is connected to the recliner 103 and operates to rotate the recliner 103 forward or rearward.

As described above, the first to third drive units operate the headrest 101, the slider 102, and the recliner 103, respectively.

Further, the sensor unit 240 is connected to the drive unit 230. The sensor unit 240 detects a position of the headrest 101, a position of the slider 102, and a rotation angle of the recliner 103. Here, the sensor unit 240 is connected to the first to third drive units of the drive unit 230 and may detect the position of the headrest 101, the position of the slider 102, and the rotation angle of the recliner 103.

The sensor unit 240 may include a position sensor 241 that may detect the operation of each of the drive units 230 (e.g., a movement operation, a rotational operation, and the like) when a motor (not illustrated) provided in the drive unit 230 operates. Here, the position sensor 241 may be a Hall sensor.

The input unit 210 receives an inputted operation instruction to operate the slider 102 and the recliner 103 from a user. Here, the input unit 210 may receive the inputted operation instruction to operate the headrest 101 directly from the user.

The control unit 220 controls the drive unit 230 based on the operation instruction inputted from the input unit 210. The control unit 220 operates the headrest 101 upward or downward based on the position of the slider 102 detected by the sensor unit 240 and the rotation angle of the recliner 103 detected by the sensor unit 240 so that the sun visor positioned at the front side in the vehicle is not damaged. Here, the control unit 220 may be a micro controller unit (MCU) that may perform calculation.

Meanwhile, the control unit 220 may perform an initialization mode to control the headrest 101, the slider 102, and the recliner 103. The initialization mode may be classified into a first initialization mode to be performed in a case in which the motor provided in the drive unit 230 is initially set, and a second initialization mode to be performed in a case in which the motor provided in the drive unit 230 is used without being set.

During the first initialization mode, the control unit 220 may initialize the positions of the headrest 101, the slider 102, and the recliner 103 by operating the headrest 101, the slider 102, and the recliner 103 from an uppermost end to a lowermost end or from a rearmost side to a forwardmost side. That is, the control unit 220 may operate the slider 102, the recliner 103, and the headrest 101 forward and rearward and upward and downward in a full range in order to avoid interference between the sun visor and a roof of the vehicle caused by the operation of the slider.

During the second initialization mode, the control unit 220 may initialize the position of the headrest 101 by moving the headrest 101 to the uppermost end when the recliner 103 moves to the rearmost side or the slider 102 moves to the rearmost side. In the case in which the motor is used initially without being set, the control unit 220 may automatically move the headrest 101 to the uppermost end when the recliner 103 moves to the rearmost side. The headrest 101 automatically moves to the uppermost end when the slider 102 moves to the rearmost, such that a position value may be initialized.

Figure 4:
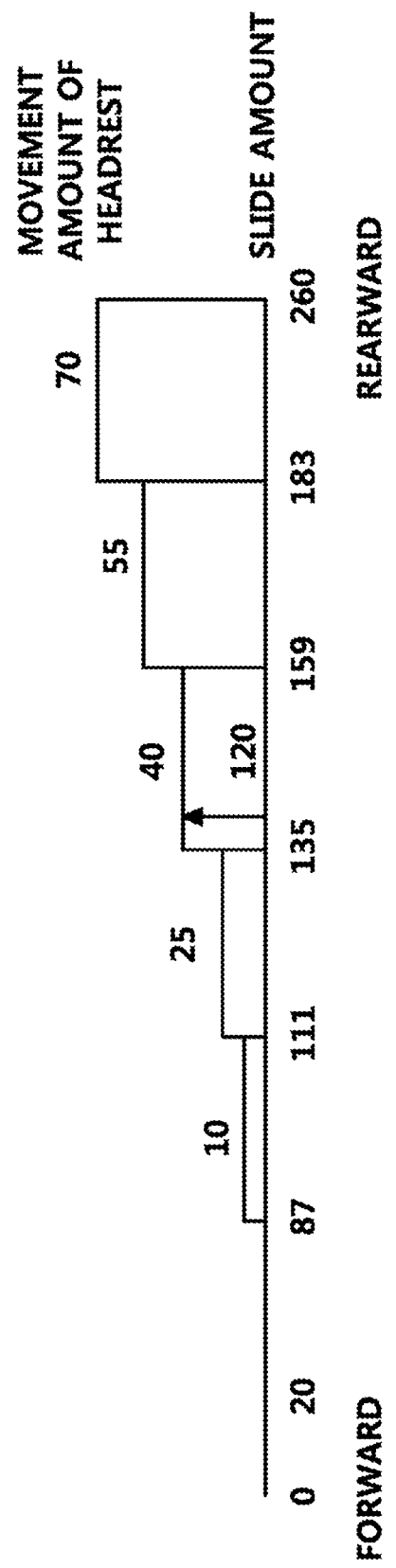
FIG. 4 is an explanatory view illustrating a movement amount of the headrest for each position section of a slider according to one or more embodiments of the present invention.

FIG. 4 is an explanatory view illustrating a movement amount of the headrest for each position section of the slider according to one or more embodiments of the present invention.

The control unit 220 moves the height of the headrest 101 from the uppermost end toward the lower end, and the control unit 220 moves the height of the headrest 101 in a step-by-step manner in accordance with a height section of the headrest 101 predetermined for each position section of the slider 102.

As illustrated in FIG. 4, the operations may be performed based on a value of the headrest 101 through an actual vehicle evaluation performed on the slider 102 and the headrest 101.

In respect to an example illustrated in FIG. 4, the position sections of the slider 102 are sections 260 to 0 from the rearmost side to the forwardmost side. Here, the overall position sections of the slider 102 may be divided into sections 260 to 183, sections 183 to 159, sections 159 to 135, sections 135 to 111, sections 111 to 87, and sections 87 to 20.

For example, at the moment when the slider 102 passes section 183 while the slider 102 operates from the rear side to the front side, the headrest 101 begins to move to point 55. Further, the headrest 101 does not slide between point 159 and point 183.

TABLE 1

| Reclining angle | Operation of headrest |
| --- | --- |
| Less than 25° forward at rearmost side (0°) | No operation |
| 25° or more forward | Downward operation |

As shown in Table 1, the control unit 220 does not operate the headrest 101 downward when the rotation angle of the recliner 103 is within a predetermined first angle section. In addition, the control unit 220 may operate the height of the headrest 101 downward when the rotation angle is within a predetermined second angle section.

The operation of the headrest in conjunction with the operation of the recliner may be applied in a case in which the position of the slider 102 cannot be ascertained or the motor is broken down. The control unit 220 may operate the headrest 101 to the lowermost end when the angle of the seatback moves forward from the rearmost side by 25° or more (approximately 90° with respect to the cushion at a lateral side).

Here, the predetermined first and second angle sections may be distinguished from each other based on a right angle (e.g., 25° based on the rearmost side) at which the recliner 103 rotates from the rearmost side and becomes normal to the cushion of the seat 100.

FIGS. 5A to 5E are explanatory views each illustrating an operation of the headrest for each movement position of the slider and each rotation angle of the recliner according to one or more embodiments of the present invention.

Figure 5A:
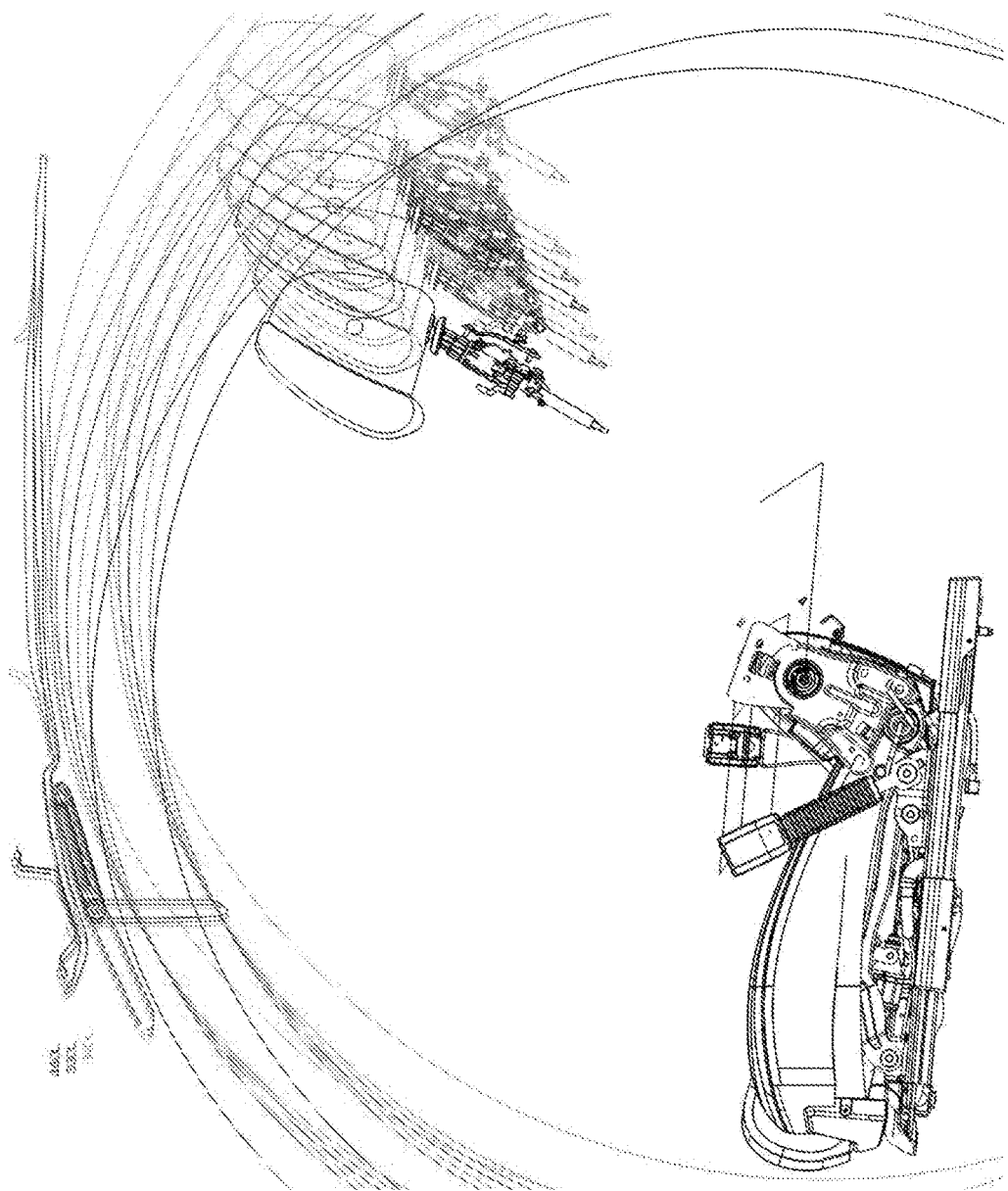
FIGS. 5A to 5E are explanatory views each illustrating an operation of the headrest for each movement position of the slider and each rotation angle of a recliner according to one or more embodiments of the present invention.
Figure 5B:
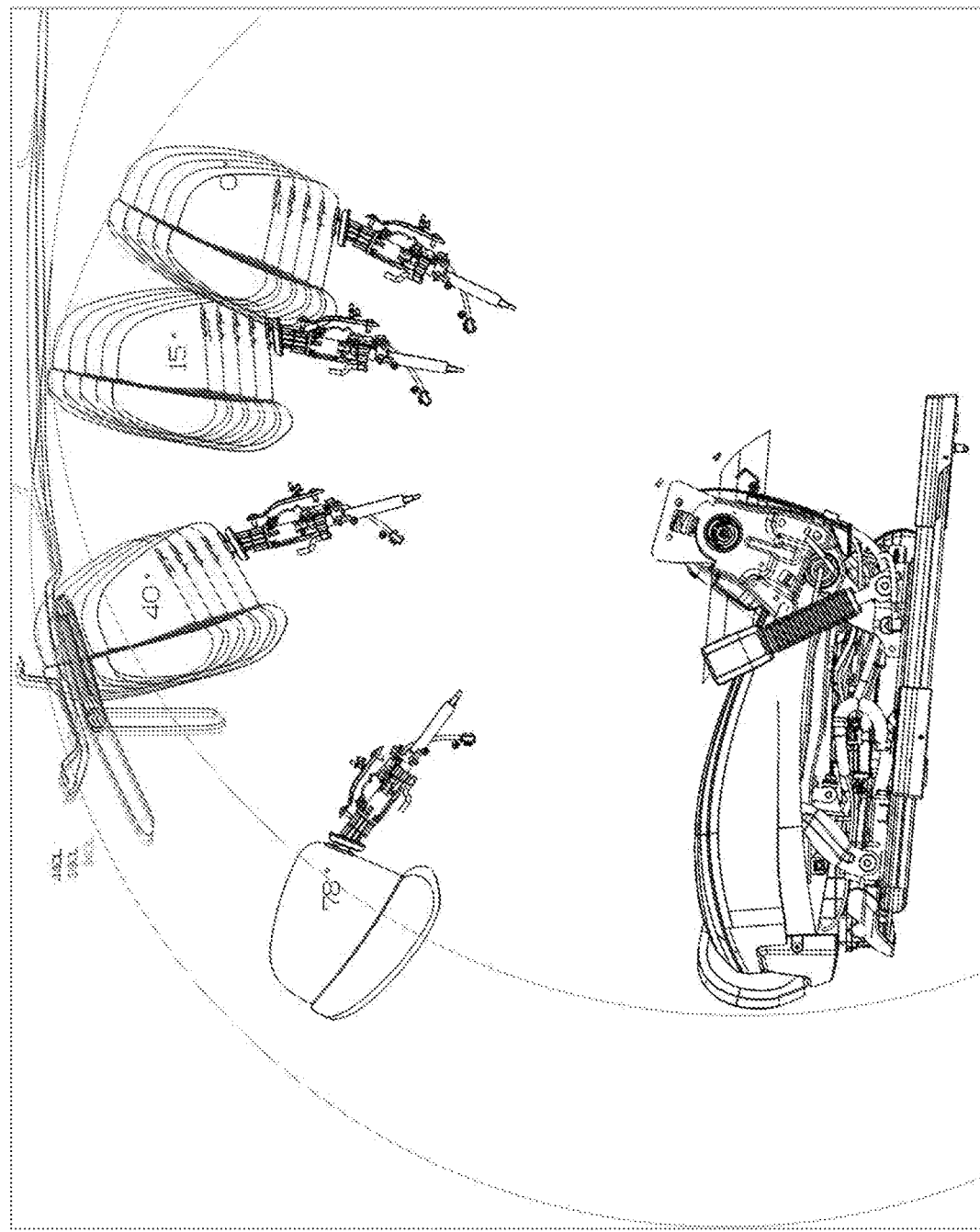
Figure 5C:
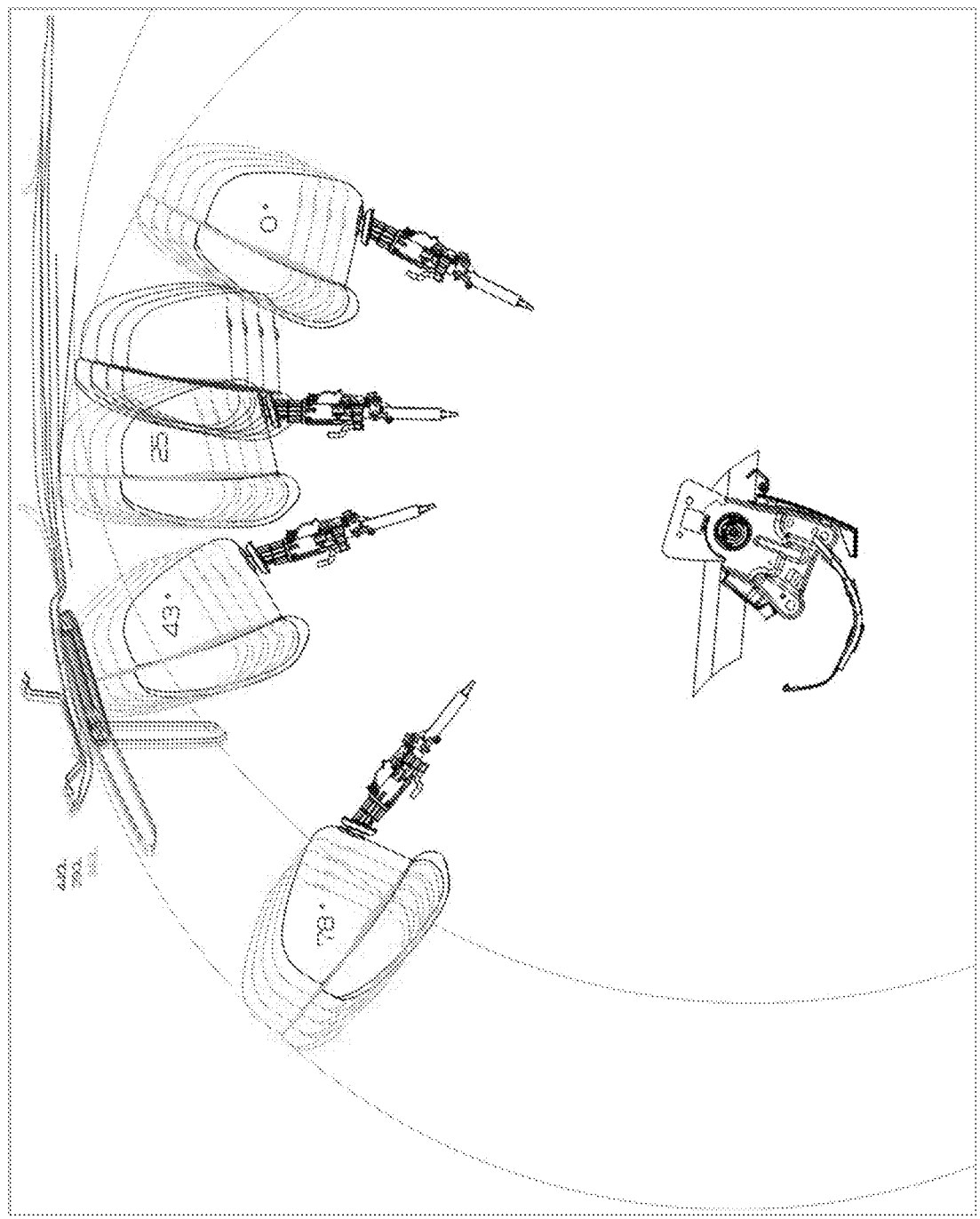
Figure 5D:
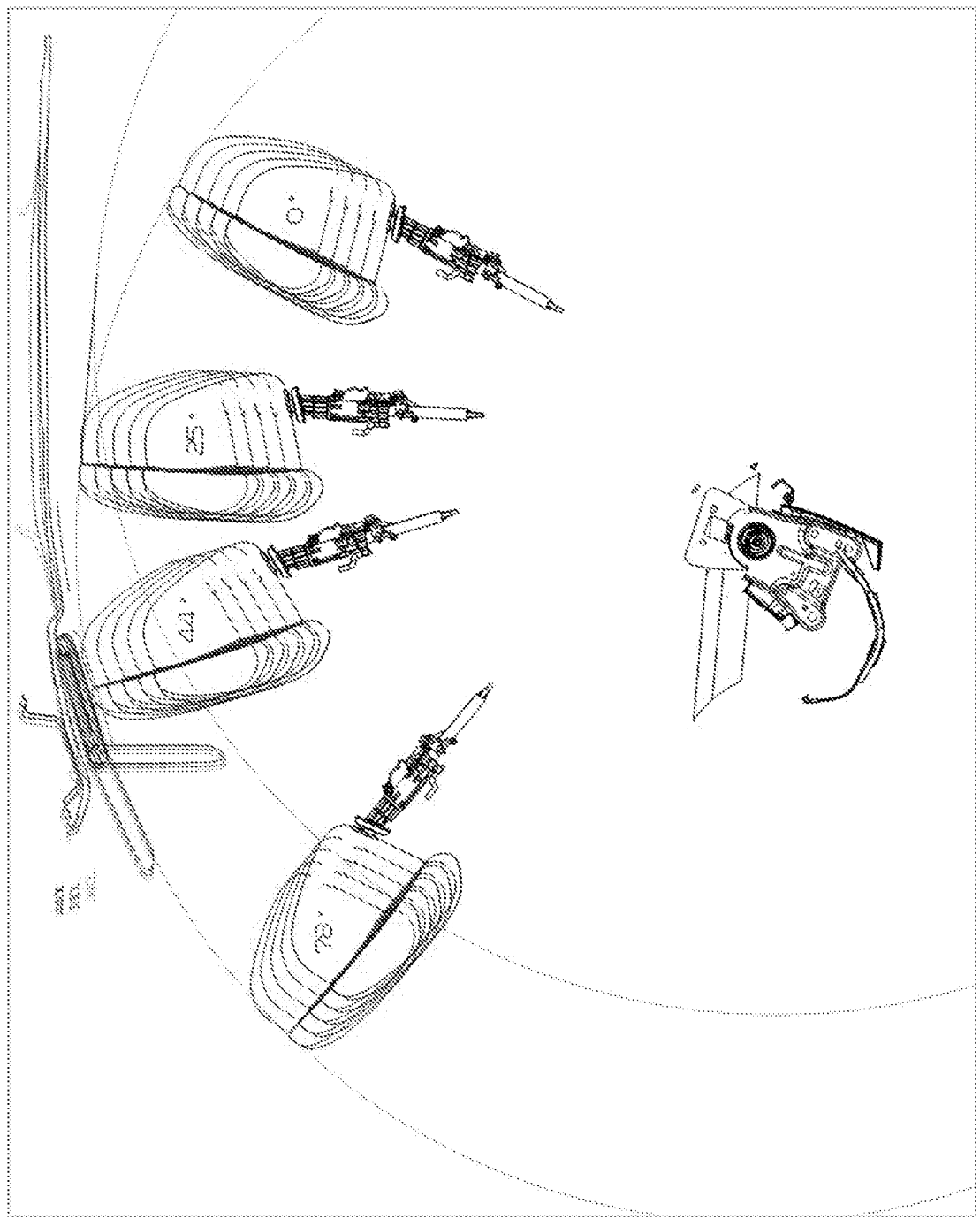
Figure 5E:
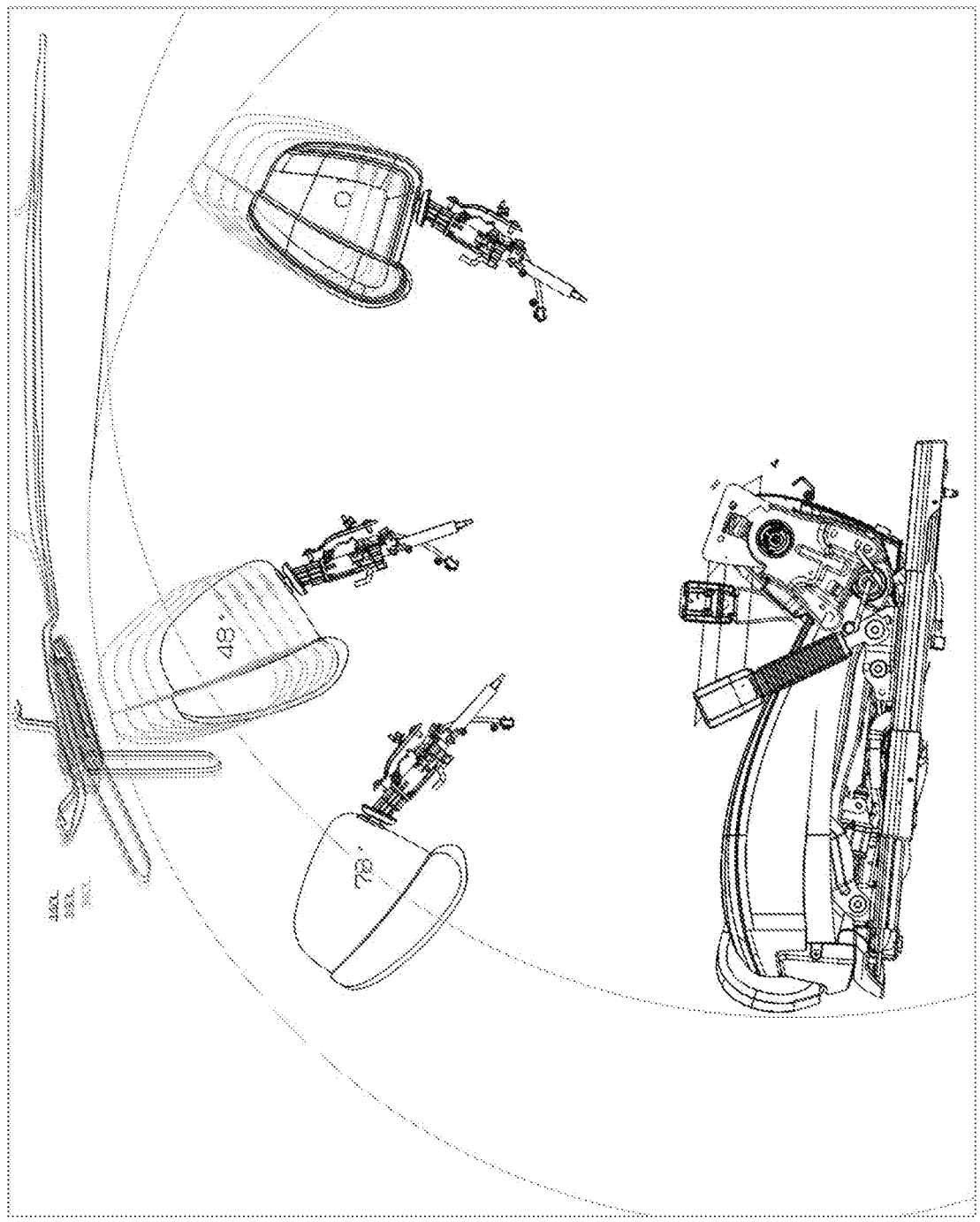

FIG. 5A illustrates the accumulated positions of the headrest 101 that operates from the uppermost end to the lowermost end for each movement position of the slider 102 and for each rotation angle of the recliner 103.

FIGS. 5B to 5E illustrate the accumulated positions of the headrest 101 illustrated in FIG. 5A for each movement position of the slider 102 and for each rotation angle of the recliner 103. As illustrated in FIGS. 5B to 5E, the headrest 101 may interfere with the sun visor positioned on the ceiling of the vehicle in accordance with the movement position of the headrest 101 and may damage the sun visor. FIGS. 5B to 5E illustrate positions of the headrest 101 when the movement position of the slider 102 sequentially moves from the front side toward the rearmost side.

Figure 6:
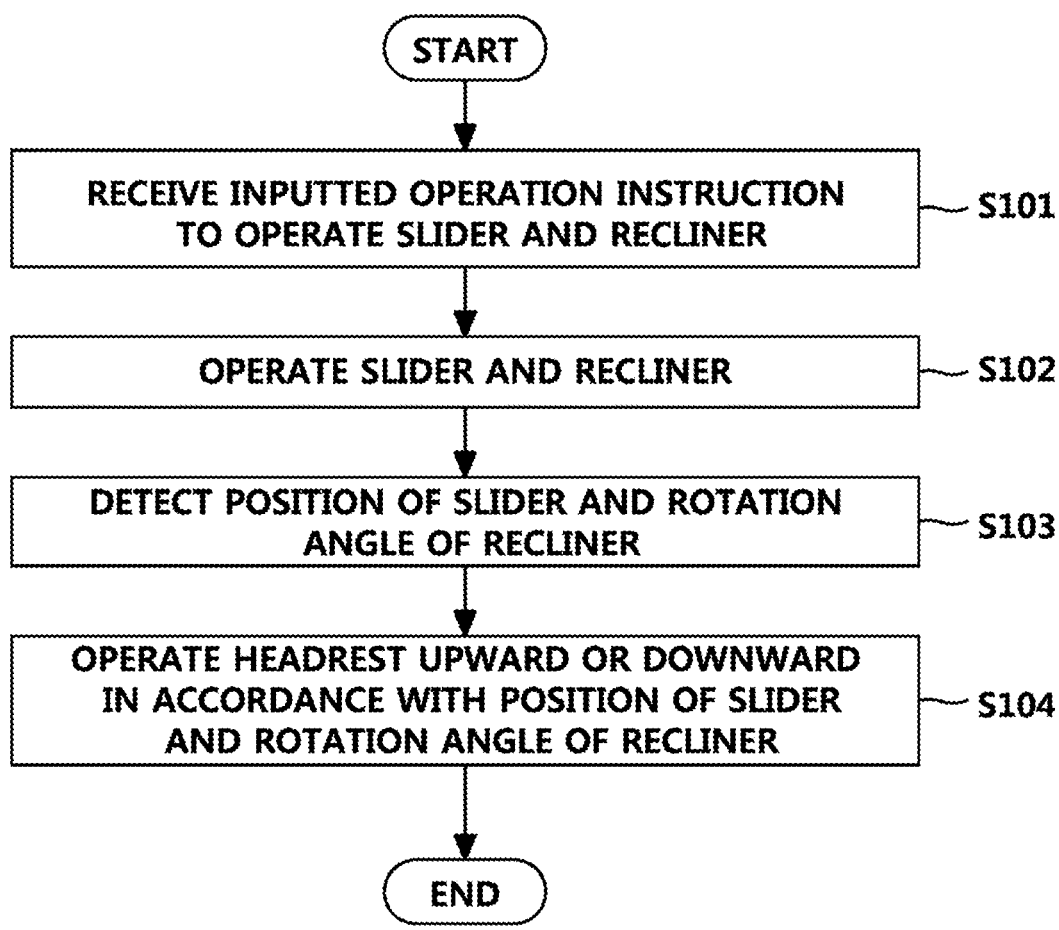
FIG. 6 is a flowchart illustrating a method for controlling the headrest for a vehicle seat according to one or more embodiments of the present invention.

FIG. 6 is a flowchart illustrating a method for controlling the headrest for a vehicle seat according to one or more embodiments of the present invention.

First, the headrest control apparatus 200 for the vehicle seat 100 may perform the initialization mode in order to control the headrest 101. In the predetermined first initialization mode, the headrest control apparatus 200 may initialize the positions of the headrest 101, the slider 102, and the recliner 103 by operating the headrest 101, the slider 102, and the recliner 103 from the uppermost end to the lowermost end or from the rearmost side to the forwardmost side. Alternatively, in the predetermined second initialization mode, the headrest control apparatus 200 may initialize the position of the headrest 101 by moving the headrest 101 to the uppermost end when the recliner 103 is moved to the rearmost side or the slider 102 is moved to the rearmost side.

The headrest control apparatus 200 for the vehicle seat 100 receives an inputted operation instruction to operate the slider 102 and the recliner 103 (S101).

Further, the headrest control apparatus 200 operates the slider 102 and the recliner 103 (S102).

Next, the headrest control apparatus 200 detects the position of the slider 102 and the rotation angle of the recliner 103 (S103).

Thereafter, the headrest control apparatus 200 operates the headrest 101 upward or downward in accordance with the position of the slider 102 and the rotation angle of the recliner 103 (S104). In this case, the headrest control apparatus 200 may operate the headrest 101 in a step-by-step manner in accordance with the height section of the headrest 101 predetermined for each position section of the slider 102. The headrest control apparatus 200 does not operate the headrest 101 downward when the rotation angle of the recliner 103 is within the predetermined first angle section, and operates the height of the headrest 101 downward to the lowermost end when the rotation angle is within the predetermined second angle section.

The previously-described embodiments are just illustrative, and various modifications and alterations may be made by those skilled in the art to which the present invention pertains without departing from the essential features of the present invention. Therefore, the previously-described embodiments of the present invention are provided for illustrative purposes only but not intended to limit the technical concept of the present invention. The scope of the technical concept of the present invention is not limited thereto. The protective scope of the present invention should be construed based on the following claims, and all the technical spirit in the equivalent scope thereto should be construed as falling within the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An apparatus for controlling a headrest for a vehicle seat, the apparatus comprising:
a headrest disposed at an upper side of the vehicle seat and that moves to an upper end or a lower end;
a slider that moves the seat forward or rearward;
a recliner that rotates the seat forward or rearward;
a drive unit that operates the headrest, the slider and the recliner, the drive unit including a first drive unit connected to the headrest, a second drive unit connected to the slider, and a third drive unit connected to the recliner;

a sensor unit connected to the first, the second, and the third drive units of the drive unit and that detects a position of the headrest, a position of the slider, and a rotation angle of the recliner;

an input unit that receives an inputted operation instruction to operate the slider and the recliner from a user; and a control unit that controls the first, the second, and the third drive units of the drive unit based on the inputted operation instruction and operates the headrest upward or downward by controlling the first drive unit in accordance with the detected position of the slider and the detected rotation angle of the recliner, wherein the control unit prevents the headrest from contacting a sun visor at a front side of the vehicle seat by not operating the headrest downward when the detected rotation angle of the recliner is less than 25° from a rearmost side and adjusting a height of the headrest downward to a lowermost end when the detected rotation angle is 25° or more from the rearmost side.

2. The apparatus according to claim 1, wherein the control unit initializes the position of the headrest, the position of the slider, and the rotation angle of the recliner by operating the headrest, the slider, and the recliner from an uppermost end to the lowermost end or from the rearmost side to a forwardmost side.

3. The apparatus according to claim 1, wherein the control unit initializes the position of the headrest by moving the headrest to an uppermost end when the recliner moves to the rearmost side or the slider moves to the rearmost side.

4. The apparatus according to claim 1, wherein the control unit operates the headrest upward or downward and operates the headrest in a step-by-step manner in accordance with a predetermined height section of the headrest for each position section of the slider.

5. A method for controlling a headrest performed by an apparatus including a drive unit directly connected to the headrest for controlling the headrest for a vehicle seat, the method comprising:

receiving an inputted operation instruction to operate a slider and a recliner from a user;

operating each of the slider and the recliner based on the inputted operation instruction;

detecting a position of the slider and a rotation angle of the recliner;

operating the headrest upward or downward by controlling the drive unit directly connected to the headrest in accordance with the detected position of the slider and the detected rotation angle of the recliner;

preventing the headrest from contacting a sun visor at a front side of the vehicle seat by not operating the headrest downward when the detected rotation angle of the recliner is less than 25° from a rearmost side and adjusting a height of the headrest downward to a lowermost end when the detected rotation angle is 25° or more from the rearmost side.

6. The method according to claim 5, further comprising initializing the position of the headrest, the position of the slider and the rotation angle of the recliner by operating the headrest, the slider, and the recliner from an uppermost end to the lowermost end or from the rearmost side to a forwardmost side in a predetermined first initialization mode.

7. The method according to claim 5, further comprising initializing the position of the headrest by moving the headrest to an uppermost end when the recliner moves to the rearmost side or the slider moves to the rearmost side in a predetermined second initialization mode.

8. The method according to claim 5, wherein the headrest is operated upward or downward in a step-by-step manner in accordance with a predetermined height section of the headrest for each position section of the slider.

* * * * *